(12) United States Patent
Liu et al.

(10) Patent No.: US 12,438,239 B2
(45) Date of Patent: Oct. 7, 2025

(54) ELECTROCHEMICAL DEVICE AND ELECTRONIC DEVICE CONTAINING SAME

(71) Applicant: Ningde Amperex Technology Limited, Ningde (CN)

(72) Inventors: Ning Liu, Ningde (CN); Wu Ma, Ningde (CN); Yu Ding, Ningde (CN); Daolin Liu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 761 days.

(21) Appl. No.: 17/709,666

(22) Filed: Mar. 31, 2022

(65) Prior Publication Data

US 2023/0006311 A1  Jan. 5, 2023

(30) Foreign Application Priority Data

Jul. 5, 2021  (CN) .......................... 202110756520.5

(51) Int. Cl.
*H01M 50/529* (2021.01)
*H01M 10/0585* (2010.01)
(Continued)

(52) U.S. Cl.
CPC ..... *H01M 50/529* (2021.01); *H01M 10/0585* (2013.01); *H01M 50/204* (2021.01);
(Continued)

(58) Field of Classification Search
CPC .......................... H01M 50/529; H01M 50/533
See application file for complete search history.

(56) References Cited

U.S. PATENT DOCUMENTS 8,372,536 B2 * 2/2013 Han ...................... H01M 4/661
429/153
9,331,358 B2 5/2016 Bhardwaj et al.
(Continued)

FOREIGN PATENT DOCUMENTS

CN   104143652 A * 11/2014 ........ H01M 10/0404
CN   108630995 A   10/2018
(Continued)

OTHER PUBLICATIONS

Machine translation of CN104143652 (no date) (Year: 0000).*

*Primary Examiner* — Amanda C. Walke
(74) *Attorney, Agent, or Firm* — WHDA, LLP (57) ABSTRACT

An electrochemical device includes a packaging shell having a first packaging body provided with a first dent and a first flange connected to a sidewall of the first dent, and a second packaging body provided with a second dent and a second flange connected to a sidewall of the second dent; a first electrode assembly disposed in the first dent; a second electrode assembly disposed in the second dent; and a partition plate including a partition layer and a first bonding layer located on a first surface of the partition layer. The partition plate is located between the first packaging body and the second packaging body. The flange overlaps the partition plate and extends beyond an edge of the partition plate. The partition plate fits with the first packaging body and the second packaging body to form mutually independent cavities on two sides of the partition plate.

16 Claims, 6 Drawing Sheets

(51) Int. Cl.
*H01M 50/204* (2021.01)
*H01M 50/533* (2021.01)
*H01M 50/54* (2021.01)
*H01M 10/0525* (2010.01)

(52) U.S. Cl.
CPC ......... *H01M 50/533* (2021.01); *H01M 50/54* (2021.01); *H01M 10/0525* (2013.01)

(56) References Cited

U.S. PATENT DOCUMENTS

2016/0020481 A1* 1/2016 He .................... H01M 10/0418
429/185
2018/0277904 A1 9/2018 Sasakawa et al.

FOREIGN PATENT DOCUMENTS

| CN | 113921966 B | * | 8/2024 | .......... H01M 50/209 |
| KR | 101065379 B1 | * | 9/2011 | |
| WO | WO-2019203441 A1 | * | 10/2019 | .......... H01M 10/425 |

* cited by examiner

ELECTROCHEMICAL DEVICE AND ELECTRONIC DEVICE CONTAINING SAME

CROSS-REFERENCE TO RELATED APPLICATIONS

This application claims priority to Chinese Patent Application No. 202110756520.5, filed on Jul. 5, 2021, the whole disclosure of which is incorporated herein by reference.

TECHNICAL FIELD

This application relates to the electrochemical field, and in particular, to an electrochemical device and an electronic device containing same.

BACKGROUND

Lithium-ion batteries are widely used in products such as a camera, a power tool, and an electric vehicle. It is urgent to increase the operating voltage of a lithium-ion battery to meet higher requirements posed in the market.

An existing method for increasing the operating voltage of the lithium-ion battery is to connect two electrode assemblies in series in the same packaging shell. Such a series connection structure is generally a three-layer composite structure containing a bonding layer, a partition layer, and a bonding layer in sequence, in which a partition plate is adopted. To implement sealing, the partition plate needs to be hermetically connected to both an upper packaging body and a lower packaging body of the packaging shell simultaneously. Because the partition plate is relatively thick, the increase of the energy density of the lithium-ion battery is affected. In addition, the partition plate is not conducive to folding a seal edge, or an internal stress is excessive after the edge folding, consequently reducing the sealing reliability of the lithium-ion battery.

SUMMARY

This application provides an electrochemical device and an electronic device containing same to increase an energy density thereof.

A first aspect of this application provides an electrochemical device. The electrochemical device includes a packaging shell, a first electrode assembly, a second electrode assembly, and a partition plate. The packaging shell includes a first packaging body and a second packaging body. The first packaging body is provided with a first dent and a first flange connected to a sidewall of the first dent, and the second packaging body is provided with a second dent and a second flange connected to a sidewall of the second dent. The first electrode assembly is disposed in the first dent, and the second electrode assembly is disposed in the second dent. The partition plate includes a partition layer and a first bonding layer located on a first surface of the partition layer. The first surface is opposite to an inner surface of the first packaging body. The partition plate is located between the first packaging body and the second packaging body. Along a first direction, the first flange and the second flange each comprise a first region and a second region; in the first region, the flange overlaps the partition plate in a second direction; in the second region, the flange extends beyond an edge of the partition plate. The first direction is a width direction of the first flange and the second flange, and the second direction is a thickness direction of the partition plate. Airtightness is implemented between the first region of the first flange and the first bonding layer, and airtightness is implemented between the second region of the first flange and the second region of the second flange, so that the partition plate fits with the first packaging body and the second packaging body to form mutually independent cavities on two sides of the partition plate respectively.

The partition plate according to this embodiment of this application includes the partition layer and the first bonding layer, and is relatively thin and occupies a relatively small space inside the packaging shell, thereby helping to increase the energy density of the electrochemical device. In addition, the reduced thickness of the partition plate and a hot sealing manner provided in this application can reduce a thickness of a seal edge, and further reduce a folding stress of the seal edge, thereby improving the sealing reliability of the electrochemical device.

In an implementation solution of this application, the first bonding layer is located at least in a peripheral region of the first surface of the partition layer, and an area of the peripheral region is not less than an area of the first region. Therefore, all other regions of the partition plate may be set to be the partition layer while it is ensured that the partition plate is hermetically connected to the first region, thereby further reducing the thickness of the partition plate.

In an implementation solution of this application, the partition plate further includes a second bonding layer located on a second surface of the partition layer. The second bonding layer is located at least on the periphery of the second surface of the partition layer. The first region of the second flange and the second bonding layer are in airtight connection. Therefore, the partition plate can be bonded to both the first flange and the second flange, and can make the electrochemical device more hermetic as a whole, thereby further improving the sealing reliability of the electrochemical device.

In an implementation solution of this application, along the first direction, the second region further includes a second sub-region I and a second sub-region II. The second sub-region II is located on a side of the second sub-region I away from the first region. A thickness of the second sub-region II is less than a thickness of the second sub-region I. Therefore, the seal edge is further thinned to reduce the folding stress of the seal edge, thereby improving the sealing reliability of the electrochemical device.

In an implementation solution of this application, a width of the first region is greater than or equal to 0.8 mm, and a width b of the second region is greater than or equal to 0.8 mm.

In an implementation solution of this application, a material of the partition layer includes at least one of a metal material, a first polymer material, or a carbon material; and a material of the first bonding layer and/or the second bonding layer includes the first polymer material.

In an implementation solution of this application, the metal material includes at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel (SUS), a combination or alloy thereof, or the like. The first polymer material includes at least one of polyethylene terephthalate, polybutylene terephthalate, polyethylene glycol naphthalate, polyether ether ketone, polyimide, polyamide, polyethylene glycol, polyamide imide, polycarbonate, cyclic polyolefin, polyphenylene sulfide, polyvinyl acetate, polytetrafluoroethylene, polymethylene naphthalene, polyvinylidene difluoride, polyethylene naphthalate, polypropylene carbonate, poly(vinylidene difluoride-hexafluoropropylene), poly(vinylidene difluoride-co-chlorotrifluoroethylene), organosilicon, vinylon, polypropylene, acid anhydride modified polypropylene, polyethylene, ethylene and a copolymer thereof, polyvinyl chloride, polystyrene, polyether nitrile, polyurethane, polyphenylene ether, polyester, polysulfone, poly(amorphous α-co-olefin), or a derivative thereof. The carbon material includes at least one of carbon felt, carbon film, carbon black, acetylene black, fullerene, conductive graphite film, or graphene film.

In an implementation solution of this application, a thickness of the partition plate is 30 μm to 100 μm.

In an implementation solution of this application, tabs of different polarities are disposed on the first electrode assembly and the second electrode assembly respectively. The tabs extend out of the packaging shell from the second region separately. Adjacent electrode assemblies are connected in series by the tabs.

A second aspect of this application provides an electronic device, including the electrochemical device according to the first aspect of this application.

The electrochemical device according to the embodiments of this application includes a packaging shell, a first electrode assembly, a second electrode assembly, and a partition plate. The packaging shell includes a first packaging body and a second packaging body. The first packaging body is provided with a first dent and a first flange connected to a sidewall of the first dent, and the second packaging body is provided with a second dent and a second flange connected to a sidewall of the second dent. The first electrode assembly is disposed in the first dent, and the second electrode assembly is disposed in the second dent. The partition plate includes a partition layer and a first bonding layer located on a first surface of the partition layer. The partition plate is located between the first packaging body and the second packaging body. Along a first direction, the first flange and the second flange each comprise a first region and a second region; in the first region, the flange overlaps the partition plate in a second direction; in the second region, the flange extends beyond an edge of the partition plate. The first direction is a width direction of the first flange and the second flange, and the second direction is a thickness direction of the first flange and the second flange. Airtightness is implemented between the first region of the first flange and the first bonding layer, and airtightness is implemented between the second region of the first flange and the second region of the second flange, so that the partition plate fits with the first packaging body and the second packaging body to form mutually independent cavities on two sides of the partition plate respectively. The partition plate used in the electrochemical device according to the embodiments of this application is relatively thin and occupies a relatively small space inside the packaging shell, thereby increasing the energy density of the electrochemical device. In addition, the reduced thickness of the partition plate and a sealing manner provided in this application can reduce a thickness of a seal edge, and further reduce a folding stress of the seal edge, thereby improving the sealing reliability of the electrochemical device. Therefore, the electronic device according to the embodiments of this application also achieves a high energy density and sealing reliability.

BRIEF DESCRIPTION OF DRAWINGS

To describe the technical solutions in the embodiments of this application more clearly, the following outlines the drawings to be used in the embodiments of this application or the prior art. Evidently, the drawings outlined below are merely a part of embodiments of this application.

REFERENCE NUMERALS

10. Electrode assembly; 11. First electrode assembly; 12. Second electrode assembly; 20. Partition plate; 40. Packaging shell; 41. First packaging body; 42. Second packaging body; 50. Tab; 51. First positive tab; 52. First negative tab; 53. Second positive tab; 54. Second negative tab; 100. Electrochemical device; 201. Partition layer; 202. First bonding layer; 203. Second bonding layer; 411. First dent; 412. First flange; 421. Second dent; 422. Second flange; 601. First region; 611. First region of the first flange; 621. First region of the second flange; 602. Second region; 612. Second region of the first flange; 622. Second region of the second flange; 6021. Second sub-region I; 6121. Second sub-region I of the first flange; 6221. Second sub-region I of the second flange; 6022. Second sub-region II; 6122. Second sub-region II of the first flange; 6222. Second sub-region II of the second flange; 4121. Top seal edge; 4122. Bottom seal edge; 4123. First lateral seal edge; and 4124. Second lateral seal edge.

DETAILED DESCRIPTION

To make the objectives, technical solutions and advantages of this application clearer, the following describes this application in further detail with reference to drawings and embodiments. Evidently, the described embodiments are merely a part of but not all of the embodiments of this application. All other embodiments derived by a person of ordinary skill in the art based on the embodiments of this application without making any creative efforts fall within the protection scope of this application.

It needs to be noted that in the description herein, this application is construed by using a lithium-ion battery as an example of the electrochemical device, but the electrochemical device according to this application is not limited to the lithium-ion battery. Specific technical solutions are as follows:

As shown in FIG. 1 to FIG. 6, an embodiment in a first aspect of this application provides an electrochemical device 100, including a packaging shell, a first electrode assembly, a second electrode assembly, and a partition plate. The packaging shell 40 includes a first packaging body 41 and a second packaging body 42, where the first packaging body 41 is provided with a first dent 411 and a first flange 412 connected to a sidewall of the first dent 411, and the second packaging body 42 is provided with a second dent 421 and a second flange 422 connected to a sidewall of the second dent 421. The first electrode assembly 11 is disposed in the first dent 411. The second electrode assembly 12 is disposed in the second dent 421. The partition plate 20 includes a partition layer 201 and a first bonding layer 202 located on a first surface of the partition layer 201. The partition plate 20 is located between the first packaging body 41 and the second packaging body 42. Along a first direction x (that is, a width direction of the first flange 412 and the second flange 422), the first flange 412 and the second flange 422 each include a first region 601 in which the flange overlaps the partition plate 20 in a second direction y (that is, a thickness direction of the partition plate 20), and a second region 602 in which the flange extends beyond an edge of the partition plate 20. Airtightness is implemented between the first region 611 of the first flange and the first bonding layer 202, and airtightness is implemented between the second region 612 of the first flange and the second region 622 of the second flange, so that mutually independent cavities (not shown in the drawing) are formed on two sides of the partition plate 20 respectively. The electrode assembly 10 and an electrolyte (not shown in the drawing) are sealed in each of the cavities independently.

Figure 3:
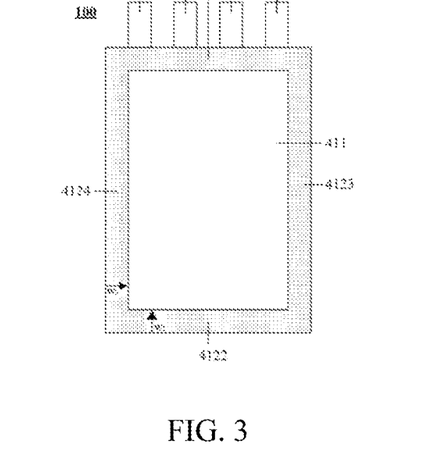
FIG. 3 is a top view of the electrochemical device shown in FIG. 1.

The first flange 412 includes a top seal edge 4121, a bottom seal edge 4122, a first lateral seal edge 4123, and a second lateral seal edge 4124. The width direction of the first flange 412 varies adaptively with the top seal edge 4121, the bottom seal edge 4122, the first lateral seal edge 4123, and the second lateral seal edge 4124. For example, as shown in FIG. 3, the width direction of the top seal edge 4121 and the bottom seal edge 4122 is the direction indicated by $w_1$, and the width direction of the first lateral seal edge 4123 and the second lateral seal edge 4124 is the direction indicated by $w_2$. A person skilled in the art understands that the width direction of the second flange 422 is interpreted in the same way as the width direction of the first flange 412, and is not interpreted herein in detail.

In the electrochemical device 100 according to this application, the partition plate 20 includes a partition layer 201 and a first bonding layer 202 located on a first surface of the partition layer 201. A total thickness of two layers of partition plates is generally less than a total thickness of two layers of aluminum plastic films. Therefore, the partition plate 20 according to this application is relatively thin. The partition plate 20 applied to the electrochemical device 100 can reduce the volume and weight of the electrochemical device 100, thereby increasing the energy density of the electrochemical device 100.

Understandably, alternatively, depending on the variation of adjacent positions between the first bonding layer 202 and the first packaging body 41 and the second packaging body 42, airtightness is implemented between the first region 621 of the second flange and the first bonding layer 202, and airtightness is implemented between the second region 612 of the first flange and the second region 622 of the second flange. This prevents a relatively thick seal edge from being formed by extending the edge of the partition plate 20 to the outermost ends of the first flange 412 and the second flange 422, where the thick seal edge includes three stacked layers: the first flange 412, the partition plate 20, and the second flange 422. The thickness of the seal edge in this application is less than the thickness of the three-layer stacked seal edge. This facilitates folding of the seal edge and reduces the folding stress of the seal edge, thereby improving the sealing reliability of the electrochemical device 100.

Figure 7:
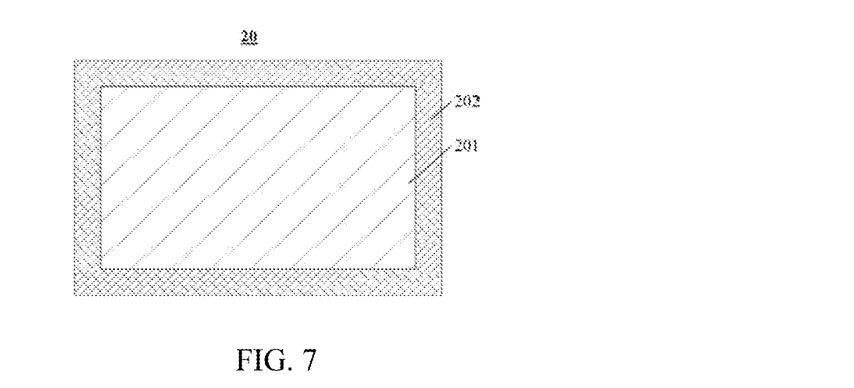
FIG. 7 is a top view of an partition plate according to some embodiments of this application.

In some embodiments of this application, the first bonding layer 202 is located at least in a peripheral region of the first surface of the partition layer 201, and an area of the peripheral region is not less than an area of the first region. Understandably, in some embodiments, as shown in FIG. 7, the first bonding layer 202 overlays the periphery of the first surface of the partition layer 201. In other embodiments, the first bonding layer 202 overlays the entire first surface of the partition layer 201. With the first bonding layer 202 disposed, the partition plate 20 is hermetically fixed to the first packaging body 41 or the second packaging body 42 to form a cavity. Then, the first packaging body 41 and the second packaging body 42 are sealed to form another cavity. The internal space of the packaging shell 40 is partitioned into two independent cavities. In this way, each electrode assembly 10 together with the electrolyte is sealed in an independent cavity. Ion insulation is implemented between the cavities to avoid a short circuit inside the electrochemical device 100 and electrolyte decomposition under a high voltage. Further, the disposition ensures a sufficient region of bonding between the edge of the partition plate 20 and the first region 601, thereby improving the safety performance of the electrochemical device 100 in use and ensuring an effective electrical energy output of the electrochemical device 100.

Figure 8:
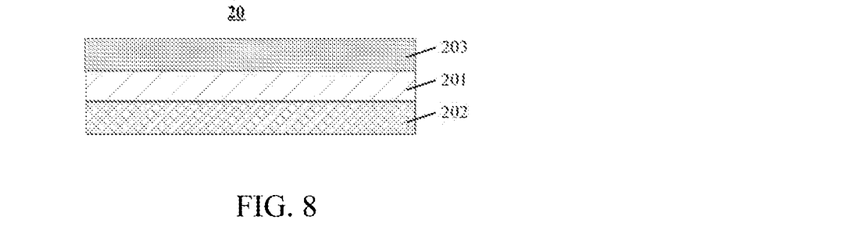
FIG. 8 is a schematic structural diagram of a partition plate according to some other embodiments of this application.
Figure 9:
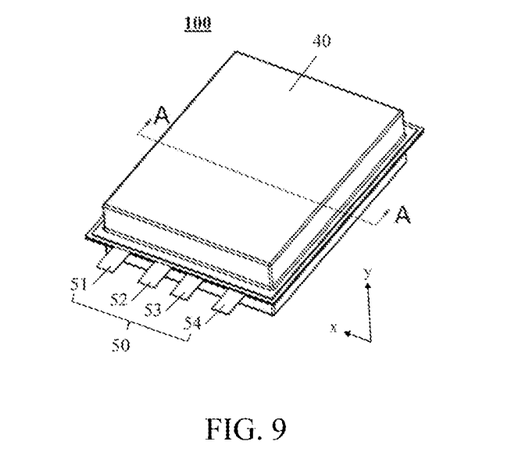
FIG. 9 is a schematic structural diagram of an electrochemical device according to some other embodiments of this application.

In some embodiments of this application, as shown in FIG. 8, the partition plate 20 further includes a second bonding layer 203 located on a second surface of the partition layer 201. The second bonding layer 203 is located at least on the periphery of the second surface of the partition layer 201. Airtightness is implemented between the first region 621 of the second flange and the second bonding layer 203. Specifically, in some embodiments, the first bonding layer 202 overlays the periphery of the first surface of the partition layer 201, and the second bonding layer 203 overlays the periphery of the second surface of the partition layer 201. In some other embodiments, the first bonding layer 202 overlays the periphery of the first surface of the partition layer 201, and the second bonding layer 203 overlays the entire second surface of the partition layer 201. The second bonding layer 203 is located on the second surface of the partition layer 201 so that airtightness is implemented between the first region 621 of the second flange and the second bonding layer 203. In this way, airtightness is implemented between the first region 611 of the first flange and the first bonding layer 202 of the partition plate 20, and airtightness is implemented between the first region 621 of the second flange and the second bonding layer 203. In this way, the partition plate 20 is bonded to both the first flange 412 and the second flange 422, thereby improving the overall airtightness of the electrochemical device 100, reducing electrolyte leakage hazards more effectively, and improving the sealing reliability of the electrochemical device 100.

Figure 4:
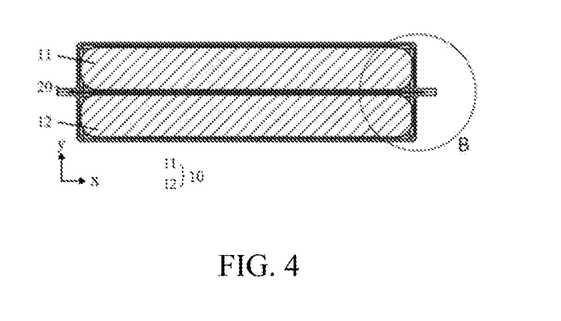
FIG. 4 is a schematic sectional view of the electrochemical device shown in FIG. 1 and sectioned along an A-A direction.
Figure 5:
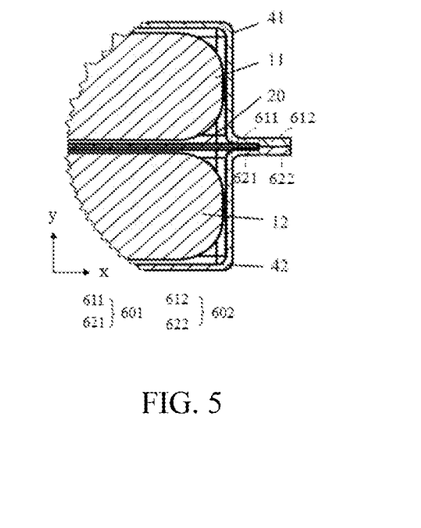
FIG. 5 is a schematic structural diagram of a region B shown in FIG. 4.
Figure 6:
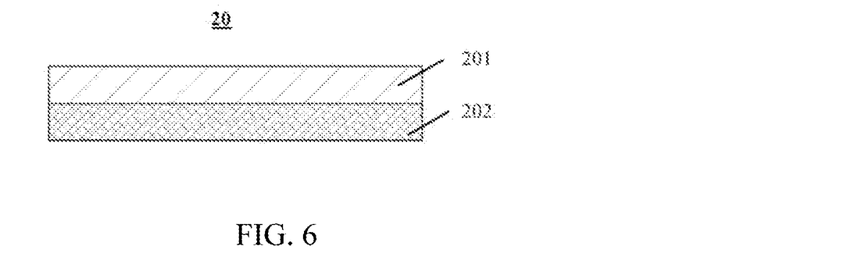
FIG. 6 is a schematic structural diagram of a partition plate according to some embodiments of this application.

In some embodiments of this application, as shown in FIG. 4 and FIG. 5, the width a of the first region 601 is greater than or equal to 0.8 mm, and the width b of the second region 602 is greater than or equal to 0.8 mm. By controlling the width a of the first region 601 to fall within the above range, at least some extent of airtightness is ensured between the first region 601 and the partition plate 20. By controlling the width b of the second region 602 to fall within the above range, at least some extent of airtightness is ensured between the first packaging body 41 and the second packaging body 42. Therefore, by setting the width a of the first region 601 and the width b of the second region 602 to fall within the above ranges simultaneously, the solution disclosed herein can further improve the sealing performance of the electrochemical device 100, and thereby improve the sealing reliability of the electrochemical device 100. In some embodiments of this application, for simplicity of the sealing process, the thickness of the first region 601 is the same as the thickness of the second region 602. In other words, the outer surfaces of the first flange 412 and the second flange 422 that contain the first region 601 and the second region 602 are flat.

Further, along the second direction, the first flange 412 and the second flange 422 overlap to form a seal edge. A single-fold structure or a double-fold structure may be selected as the folded-edge structure of the seal edge, depending on the width a of the first region 601 and the width b of the second region 602 as well as the total thickness of the electrochemical device 100. With the single-fold structure or double-fold structure formed, the electrochemical device 100 is further downsized, thereby increasing the energy density of the electrochemical device 100. The bonding material required for forming the single-fold structure or double-fold structure is not particularly limited in this application as long as the objectives of this application can be achieved.

In some embodiments of this application, as shown in FIG. 9 to FIG. 14, along the first direction x, the second region 602 further includes a second sub-region I 6021 and a second sub-region II 6022. The second sub-region II 6022 is located on a side that is of the second sub-region I 6021 and that is away from the first region 601. The thickness of the second sub-region II 6022 is less than the thickness of the second sub-region I 6021, so that the second region 602 forms a stepped shape. Understandably, the second region 612 of the first flange includes a second sub-region I 6121 of the first flange and a second sub-region II 6122 of the first flange. The second region 622 of the second flange includes a second sub-region I 6221 of the second flange and a second sub-region II 6222 of the second flange. This can reduce the sealing thickness at the ends of the first flange 412 and the second flange 422, reduce the folding stress, and improve the sealing effect of the packaging shell 40, thereby improving the sealing reliability of the electrochemical device 100.

Figure 13:
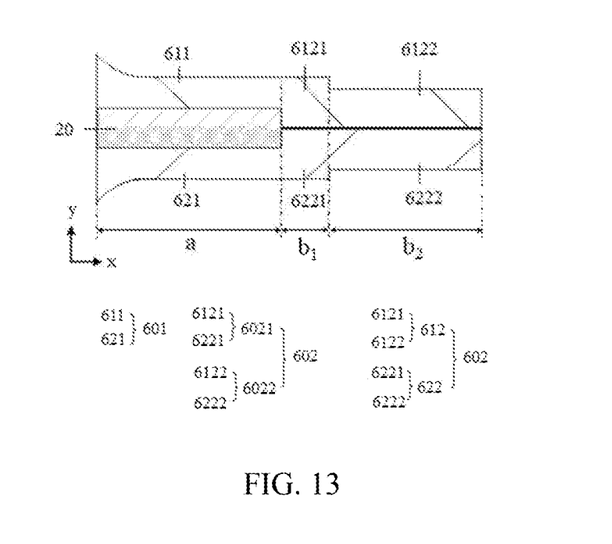
FIG. 13 is a schematic structural diagram of a region D shown in FIG. 12.

The manner of forming the second region 602 is not particularly limited in this application, as long as the objectives of this application can be achieved. In some embodiments, regions that are of the first flange 412 and the second flange 422 and that extend beyond the edge of the partition plate 20 are sealed by using a heat-sealing head. The surface of the heat-sealing head is designed to be stepped. Therefore, as shown in FIG. 13, a second sub-region II 6022 is formed on a side that is of the second sub-region I 6021 and that is away from the first region 601. In this way, the stepped design of the heat-sealing head can also reduce the thickness of the seal edge, so as to form a relatively thin second sub-region II 6022. Therefore, the design facilitates folding of the seal edge and reduces the folding stress of the seal edge. In addition, an extrusion force brought by the designed steps further helps to exhaust the gas at the heat-seal joint between the first flange 412 together with the second flange 422 and the end face of the partition plate 20, thereby increasing the bonding force between the end face of the partition plate 20 and the second region 602, and improving the sealing effect.

Figure 14:
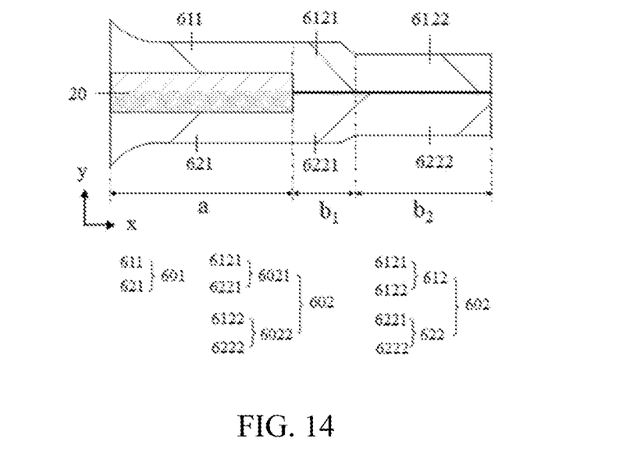
FIG. 14 is another schematic structural diagram of a region D shown in FIG. 12.

Specifically, in some embodiments, as shown in FIG. 13, the second sub-region I 6021 transitions to the second sub-region II 6022 through a vertical step. The vertical step designed increases the bonding force between the end face of the partition plate 20 and the second region 602, and enhances airtightness between the partition plate 20 and the second region 602. In some other embodiments, as shown in FIG. 14, the second sub-region I 6021 transitions to the second sub-region II 6022 through an oblique step. The oblique step designed prevents the packaging shell 40 from undergoing an excessive tensile stress during heat sealing, thereby reducing the hazard of tearing of the packaging bag caused by the excessive stress, and further improving the sealing reliability of the electrochemical device 100.

In some embodiments of this application, the material of the partition layer 201 includes at least one of a metal material, a first polymer material, or a carbon material. The material of the first bonding layer 202 and/or the second bonding layer 203 includes the first polymer material. In this application, the type of the metal material is not particularly limited, as long as the objectives of this application can be achieved. For example, the metal material may include at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel (SUS), a combination or alloy thereof, or the like. In this application, the type of the first polymer material is not particularly limited, as long as the objectives of this application can be achieved. For example, the first polymer material may include at least one of polyethylene terephthalate, polybutylene terephthalate, polyethylene glycol naphthalate, polyether ether ketone, polyimide, polyamide, polyethylene glycol, polyamide imide, polycarbonate, cyclic polyolefin, polyphenylene sulfide, polyvinyl acetate, polytetrafluoroethylene, polymethylene naphthalene, polyvinylidene difluoride, polyethylene naphthalate, polypropylene carbonate, poly(vinylidene difluoride-hexafluoropropylene), poly(vinylidene difluoride-co-chlorotrifluoroethylene), organosilicon, vinylon, polypropylene, acid anhydride modified polypropylene, polyethylene, ethylene and a copolymer thereof, polyvinyl chloride, polystyrene, polyether nitrile, polyurethane, polyphenylene ether, polyester, polysulfone, poly(amorphous α-co-olefin), or a derivative thereof. In this application, the type of the carbon material is not particularly limited, as long as the objectives of this application can be achieved. For example, the carbon material may include at least one of carbon felt, carbon film, carbon black, acetylene black, fullerene, conductive graphite film, or graphene film.

Preferably, the material of the partition layer 201 includes a metal material. The metal material is reliable for serving a partitioning function, and is highly tough and compact, and can be processed to a thinner size to increase the energy density of the electrochemical device 100. Preferably, the material of the partition layer 201 includes a carbon material. The carbon material achieves excellent safety performance and heat conductivity, and is very reliable under a high temperature. Preferably, the material of the partition layer 201 includes a first polymer material. The density of the first polymer material is low, thereby reducing the weight of the partition plate and increasing the energy density of the electrochemical device 100. In addition, the first polymer material generates are less prone to generate scraps in a case of mechanical abuse (such as nail penetration, impact, and crush), and is more effective in wrapping a mechanically broken surface, thereby improving safety performance in the case of mechanical abuse, increasing the safety test pass rate, and further improving the safety performance of the electrochemical device 100. Preferably, the material of the partition layer 201 includes a composite material compounded of at least two of a first polymer material, a metal material, or a carbon material. The type of the composite material is not particularly limited, as long as the objectives of this application can be achieved. For example, the composite material may include a Ni-metal foil composite PP film, an Ag-metal foil composite PET film, a polyurethane-stainless steel-polyurethane composite material, a PP—Al—PP composite material, or the like.

In some embodiments of this application, the thickness of the partition plate 20 is 30 μm to 100 μm, and preferably, 50 μm to 80 μm. For example, a lower limit of the thickness of the partition plate 20 may be, but is not limited to, 30 μm, 40 μm, 50 μm, or 60 μm, and an upper limit of the thickness of the partition plate 20 may be, but is not limited to, 65 μm, 75 μm, 80 μm, 85 μm, 90 μm, or 100 μm. When the partition plate 20 is excessively thin (for example, thinner than 30 μm), the capability of the partition plate 20 in separating from the electrolytic solution will be affected, and the electrolytic solution in the cavities on both sides of the partition plate 20 is prone to penetrate the partition layer 201 of the partition plate 20, consequently affecting the electrochemical performance of the electrochemical device 100. When the partition plate 20 is excessively thick (for example, thicker than 100 μm), the volume of the electrochemical device 100 is increased, consequently reducing the energy density of the electrochemical device 100.

In this application, the thicknesses of the partition layer 201, the first bonding layer 202, and the second bonding layer 203 are not particularly limited, as long as the objectives of this application can be achieved. For example, the thickness of the partition layer 201 may be 20 μm to 70 μm, and preferably, 40 μm to 50 μm. The thicknesses of the first bonding layer 202 and the second bonding layer 203 may be 10 μm to 30 μm, and preferably, 20 μm to 25 μm.

In some embodiments of this application, as shown in FIG. 1, FIG. 2, FIG. 9, and FIG. 10, tabs 50 of different polarities are disposed on the electrode assembly 10 in the cavity. The tabs 50 extend out of the packaging shell 40. Adjacent electrode assemblies 10 are connected in series by the tabs 50. One end of each of the tabs 50 extends into the packaging shell 40, and is electrically connected to the electrode plate of a corresponding polarity. The other end of the tab 50 extends out of the packaging shell 40. Understandably, the electrical connection between the tab 50 and the electrode plate of the corresponding polarity includes two scenarios. One scenario is that the tab 50 is directly connected to the electrode plate. For example, the tab 50 and a current collector are welded together or integrally formed, so that the tab directly extends out of the packaging shell 40 from the electrode plate. The other scenario is that the tab 50 is indirectly connected to the electrode plate. For example, the tab 50 is connected to the electrode plate by welding an adapter piece, and extends out of the packaging shell 40. In this application, the electrode plate includes a positive electrode plate and a negative electrode plate.

Figure 1:
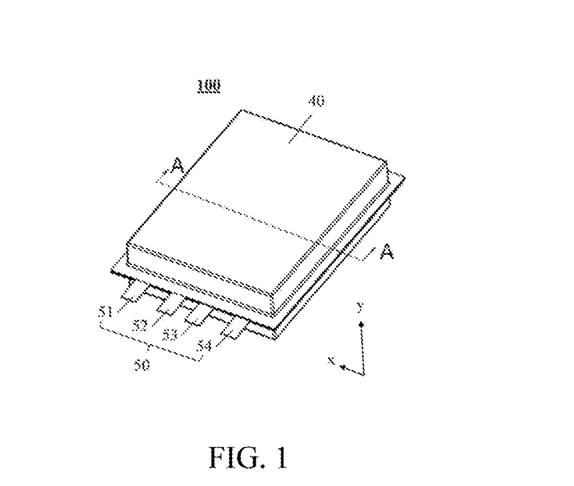
FIG. 1 is a schematic structural diagram of an electrochemical device according to some embodiments of this application.
Figure 2:
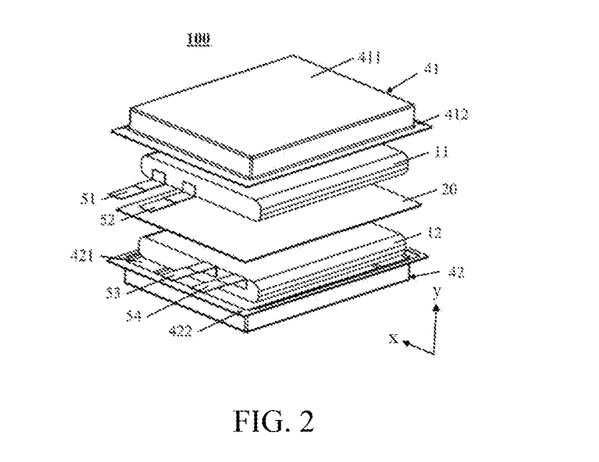
FIG. 2 is a schematic exploded view of a structure of the electrochemical device shown in FIG. 1.

As shown in FIG. 1 to FIG. 2, in an embodiment, the first electrode assembly 11 contains a first positive tab 51 and a first negative tab 52. The second electrode assembly 12 contains a second positive tab 53 and a second negative tab 54. The first positive tab 51, the first negative tab 52, the second positive tab 53, and the second negative tab 54 all extend out of the packaging shell 40 without overlapping. The adjacent first electrode assembly 11 and second electrode assembly 12 are connected in series by the first negative tab 52 and the second positive tab 53. The first positive tab 51 and the second negative tab 54 are used as a positive terminal and a negative terminal respectively for connecting during charging and discharging. When all the tabs 50 of the electrode assembly 10 extend out of the packaging shell 40 for welding, the welding effect of the tabs 50 can be monitored at any time, thereby reducing the hazard of breakage of the tabs 50, and avoiding a problem that the internal resistance of the electrochemical device 100 increases due to poor welding of the tabs 50. Adjacent electrode assemblies 10 are connected to each other in series, thereby effectively increasing the output voltage of the electrochemical device 100.

Further, the first negative tab 52 and the second positive tab 53 that connect the adjacent first electrode assembly 11 and second electrode assembly 12 in series may extend out of the packaging shell 40 while at least partly overlapping.

In this application, the material of the tabs 50 is not particularly limited, as long as the objectives of this application can be achieved. For example, the material of the positive tab includes at least one of aluminum (Al) or aluminum alloy. The material of the negative tab includes at least one of nickel (Ni), copper (Cu), or nickel-plated copper (Ni—Cu). In this application, the welding manner of the tabs 50 is not particularly limited, as long as the objectives of this application can be achieved. For example, the welding manner may be at least one of laser welding, ultrasonic welding, resistance welding, or the like. In this application, the directions of leading out different tabs 50 are not particularly limited, as long as the objectives of this application can be achieved. For example, the directions of leading out the tabs 50 may be the same direction or different directions.

In this application, the structure of the electrode assembly 10 is not particularly limited, as long as the objectives of this application can be achieved. For example, the structure of the electrode assembly 10 may be at least one of a jelly-roll structure or a stacked structure.

In this application, the electrode assembly 10 may include a separator, a positive electrode plate, and a negative electrode plate. The separator is configured to separate the positive electrode plate from the negative electrode plate to prevent an internal short circuit of the electrochemical device 100, and allow free passage of electrolyte ions so as to complete electrochemical charging and discharging processes. In this application, the numbers of the separators, positive electrode plates, and negative electrode plates are not particularly limited, as long as the objectives of this application can be achieved.

In this application, the type of the separator is not particularly limited, as long as the objectives of this application can be achieved. For example, the separator may be at least one of: a polyethylene (PE)- and polypropylene (PP)-based polyolefin (PO) separator, a polyester film (such as polyethylene terephthalate (PET) film), a cellulose film, a polyimide film (PI), a polyamide film (PA), a spandex or aramid film, a woven film, a non-woven film (non-woven fabric), a microporous film, a composite film, separator paper, a laminated film, or a spinning film. For example, the separator may include a substrate layer and a surface treatment layer. The substrate layer may be a non-woven fabric, film or composite film, which, in each case, is porous. The material of the substrate layer may include at least one of polyethylene, polypropylene, polyethylene terephthalate, polyimide, or the like. Optionally, the substrate layer may be a polypropylene porous film, a polyethylene porous film, a polypropylene non-woven fabric, a polyethylene non-woven fabric, or a polypropylene-polyethylene-polypropylene porous composite film. Optionally, a surface treatment layer is disposed on at least one surface of the substrate layer. The surface treatment layer may be a polymer layer or an inorganic compound layer, or a layer formed by mixing a polymer and an inorganic compound. For example, the inorganic compound layer includes inorganic particles and a binder. The inorganic particles are not particularly limited, and may be at least one selected from: aluminum oxide, silicon oxide, magnesium oxide, titanium oxide, hafnium dioxide, tin oxide, cerin, nickel oxide, zinc oxide, calcium oxide, zirconium oxide, yttrium oxide, silicon carbide, boehmite, aluminum hydroxide, magnesium hydroxide, calcium hydroxide, barium sulfate, or the like. The binder is not particularly limited, and may be at least one selected from polyvinylidene difluoride, poly(vinylidene difluoride-co-hexafluoropropylene), polyamide, polyacrylonitrile, polyacrylate, polyacrylic acid, polyacrylic acid sodium salt, polyvinylpyrrolidone, polyvinyl ether, poly methyl methacrylate, polytetrafluoroethylene, polyhexafluoropropylene, or the like. The polymer layer includes a polymer, and the material of the polymer includes at least one of polyamide, polyacrylonitrile, acrylate polymer, polyacrylic acid, polyacrylate, polyvinylpyrrolidone, polyvinyl ether, polyvinylidene difluoride, poly(vinylidene difluoride-hexafluoropropylene), or the like.

In this application, the positive electrode plate is not particularly limited, as long as the objectives of this application can be achieved. For example, the positive electrode plate generally includes a positive current collector and a positive active material layer. The positive current collector is not particularly limited, as long as the objectives of this application can be achieved. For example, the positive current collector may include an aluminum foil, an aluminum alloy foil, a composite current collector, or the like. The positive active material layer includes a positive active material. The type of the positive active material is not particularly limited, as long as the objectives of this application can be achieved. For example, the positive active material may include at least one of lithium nickel cobalt manganese oxide (811, 622, 523, 111), lithium nickel cobalt aluminum oxide, lithium iron phosphate, a lithium-rich manganese-based material, lithium cobalt oxide, lithium manganese oxide, lithium manganese iron phosphate, lithium titanium oxide, or the like. In this application, the thicknesses of the positive current collector and the positive active material layer are not particularly limited, as long as the objectives of this application can be achieved. For example, the thickness of the positive current collector is 5 μm to 20 μm, and preferably, 6 μm to 18 μm, and more preferably, 8 μm to 16 μm. The thickness of the positive material layer is 30 μm to 120 μm. In this application, the thickness of the positive electrode plate is not particularly limited, as long as the objectives of this application can be achieved. For example, the thickness of the positive electrode plate is 35 μm to 140 μm. Optionally, the positive electrode plate may further include a conductive layer. The conductive layer is located between the positive current collector and the positive material layer. The composition of the conductive layer is not particularly limited, and may be a conductive layer commonly used in the art. The conductive layer includes a conductive agent and an binder.

In this application, the negative electrode plate is not particularly limited, as long as the objectives of this application can be achieved. For example, the negative electrode plate generally includes a negative current collector and a negative active material layer. The negative current collector is not particularly limited, as long as the objectives of this application can be achieved. For example, the negative current collector may include a copper foil, a copper alloy foil, a nickel foil, a stainless steel foil, a titanium foil, foamed nickel, foamed copper, or a composite current collector, or the like. The negative active material layer includes a negative active material, a conductive agent, and a thickener. The type of the negative active material is not particularly limited, as long as the objectives of this application can be achieved. For example, the active material may include at least one of natural graphite, artificial graphite, mesocarbon microbead (MCMB), hard carbon, soft carbon, silicon, a silicon-carbon composite, $SiO_x(0<x<2)$, Li—Sn alloy, Li—Sn—O alloy, Sn, SnO, $SnO_2$, spinel-structured lithium titanium oxide $Li_4Ti_5O_{12}$, Li—Al alloy, or metallic lithium. In this application, the thicknesses of the negative current collector and the negative active material layer are not particularly limited, as long as the objectives of this application can be achieved. For example, the thickness of the negative current collector is 6 μm to 10 μm, and the thickness of the negative active material layer is 30 μm to 120 μm. In this application, the thickness of the negative electrode plate is not particularly limited as long as the objectives of this application can be achieved. For example, the thickness of the negative electrode plate is 50 μm to 150 μm. Optionally, the negative electrode plate may further include a conductive layer. The conductive layer is located between the negative current collector and the negative material layer. The composition of the conductive layer is not particularly limited, and may be a conductive layer commonly used in the art. The conductive layer includes a conductive agent and an binder.

In this application, the conductive agent is not particularly limited, as long as the objectives of this application can be achieved. For example, the conductive agent may include at least one of conductive carbon black (Super P), carbon nanotubes (CNTs), carbon nanofibers, flake graphite, acetylene black, carbon black, Ketjen black, carbon dots, carbon nanotubes, or graphene, or the like. In this application, the binder is not particularly limited, as long as the objectives of this application can be achieved. For example, the binder may include at least one of polypropylene alcohol, sodium polyacrylate, potassium polyacrylate, lithium polyacrylate, polyimide, polyamide imide, styrene butadiene rubber (SBR), polyvinyl alcohol (PVA), polyvinylidene fluoride, polyvinylidene difluoride (PVDF), polytetrafluoroethylene (PTFE), polyvinyl butyral (PVB), water-based acrylic resin, carboxymethyl cellulose (CMC), or sodium carboxymethyl cellulose (CMC-Na), or the like.

The electrochemical device 100 according to this application further includes an electrolyte. The electrolyte may be at least one of a gel electrolyte, a solid-state electrolyte, and an electrolytic solution. The electrolytic solution includes a lithium salt and a nonaqueous solvent. In some embodiments of this application, the lithium salt may include at least one of $LiPF_6$, $LiBF_4$, $LiAsF_6$, $LiClO_4$, $LiB(C_6H_5)_4$, LiCH$_3$SO$_3$, LiCF$_3$SO$_3$, LiN(SO$_2$CF$_3$)$_2$, LiC(SO$_2$CF$_3$)$_3$, LiSiF$_6$, LiBOB, lithium difluoroborate, or the like. For example, the lithium salt is LiPF$_6$ because it provides a high ionic conductivity and improves cycle characteristics. The nonaqueous solvent may be at least one of a carbonate compound, a carboxylate compound, an ether compound, another organic solvent, or the like. The carbonate compound may be at least one of a chain carbonate compound, a cyclic carbonate compound, a fluorocarbonate compound, or the like. The chain carbonate compound may include at least one of dimethyl carbonate (DMC), diethyl carbonate (DEC), dipropyl carbonate (DPC), methyl propyl carbonate (MPC), ethylene propyl carbonate (EPC), ethyl methyl carbonate (EMC), or the like. The cyclic carbonate compound may include at least one of ethylene carbonate (EC), propylene carbonate (PC), butylene carbonate (BC), vinyl ethylene carbonate (VEC), or the like. The fluorocarbonate compound may include at least one of fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or the like. The carboxylate compound may include at least one of methyl formate, methyl acetate, ethyl acetate, n-propyl acetate, tert-butyl acetate, methyl propionate, ethyl propionate, propyl propionate, γ-butyrolactone, decanolactone, valerolactone, mevalonolactone, caprolactone, or the like. The ether compound may include at least one of dibutyl ether, tetraglyme, diglyme, 1,2-dimethoxyethane, 1,2-diethoxyethane, ethoxymethoxyethane, 2-methyltetrahydrofuran, tetrahydrofuran, or the like. The other organic solvent may include at least one of dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or the like.

In this application, the packaging shell 40 is not particularly limited, as long as the objectives of this application can be achieved. For example, the packaging shell 40 may include an inner layer and an outer layer. The inner layer is hermetically connected to the partition plate 20. Therefore, the material of the inner layer may include a polymer material, so as to achieve an excellent sealing effect. In addition, the combination of the inner layer and the outer layer can effectively protect an internal structure of the electrochemical device 100. Specifically, the material of the inner layer includes at least one of polypropylene, polyester, p-hydroxybenzaldehyde, polyamide, polyphenylene ether, polyurethane, or the like. In this application, the material of the outer layer is not particularly limited, as long as the objectives of this application can be achieved. For example, the material of the outer layer may include at least one of an aluminum foil, an aluminum oxide layer, a silicon nitride layer, or the like. In addition, the packaging shell 40 may be an aluminum plastic film instead. The aluminum plastic film includes a nylon layer, an aluminum foil layer, and a PP layer.

In this application, the thickness of the packaging shell 40 is not particularly limited, as long as the objectives of this application can be achieved. For example, the thickness of the packaging shell 40 may be 60 μm to 500 μm, and preferably, 60 μm to 300 μm, and more preferably, 60 μm to 200 μm. The packaging shell 40 falling within such a thickness range can effectively protect the internal structure of the electrochemical device 100.

In this application, the dimensions of the seal edge are not particularly limited, as long as the objectives of this application can be achieved. For example, the thickness T (unit: mm) and the width W (unit: mm) of the seal edge satisfy $0.01 \leq T/W \leq 0.05$. With the ratio of T to W falling within the above range, it is ensured that the battery is well sealed and the service life of the battery is increased. When the ratio of T to W is too low, the sealing thickness may be insufficient and the sealing effect may be poor, consequently reducing the environmental stability of the battery. For example, the water vapor in the environment is prone to penetrate into the battery, thereby increasing the moisture content in the battery, decomposing the electrolyte, and reducing the service life of the battery. If the ratio of T to W is too high, the sealing width W may be too small, also leading to a poor sealing effect and reducing the environmental stability of the battery. For example, the water vapor in the environment is prone to penetrate into the battery, thereby increasing the moisture content in the battery, causing problems such as electrolyte decomposition, and reducing the service life of the battery. In this application, neither the sealing thickness nor the sealing width is particularly limited, as long as the objectives of this application can be achieved. For example, the width W of the seal edge is preferably 1 mm to 7 mm. It needs to be noted that, in a sealing process, the polymer material in the packaging shell 40 and the sealing material are sealed together by hot pressing. Therefore, the sealing thickness T includes a thickness of a product of fusing the sealing material with the polymer material in the inner layer of the packaging shell 40. The sealing width W means a width of a sealing region formed by fusing the sealing material and the polymer material in the inner layer of the packaging shell 40 together after the hot-press sealing.

The electrochemical device 100 according to this application may further include other devices that undergo electrochemical reactions, such as a lithium metal secondary battery, a lithium polymer secondary battery, or a lithium-ion polymer secondary battery.

In this application, the preparation process of the electrochemical device 100 is not particularly limited, as long as the objectives of this application can be achieved. For example, the preparation process of the electrochemical device 100 may include: stacking a positive electrode plate and a negative electrode plate that are separated by a separator, performing operations such as winding or folding into an assembly as required, putting the assembly into the packaging shell 40, injecting an electrolytic solution into the packaging shell 40, and sealing the packaging shell. In addition, an overcurrent prevention element, a guide plate, and the like may be placed into the housing as required, so as to prevent the rise of internal pressure, overcharge, and overdischarge of the electrochemical device 100.

By using a relatively thin double-layer partition plate 20, the electrochemical device 100 according to this application reduces the volume and weight, thereby increasing the energy density of the electrochemical device 100. In addition, by disposing the first region 601 and the second region 602 on the first flange 412 and the second flange 422, the seal edge is thinned, thereby reducing the folding stress of the seal edge, and improving the sealing reliability of the electrochemical device 100.

Figure 10:
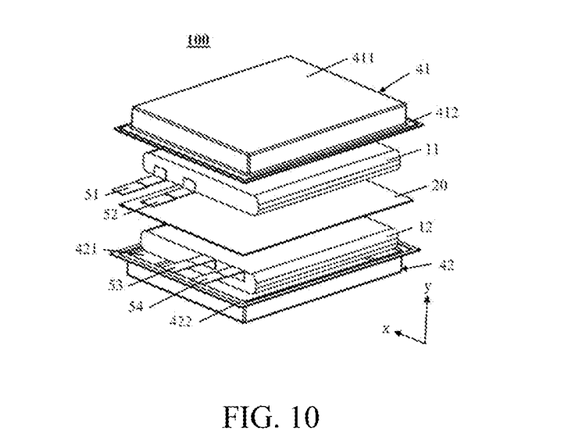
FIG. 10 is a schematic exploded view of a structure of the electrochemical device shown in FIG. 9.
Figure 11:
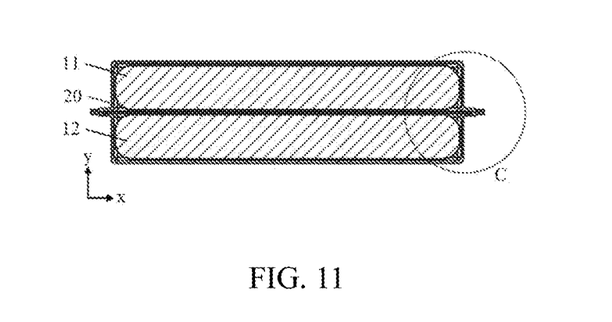
FIG. 11 is a schematic sectional view of the electrochemical device shown in FIG. 9 and sectioned along an A-A direction.
Figure 12:
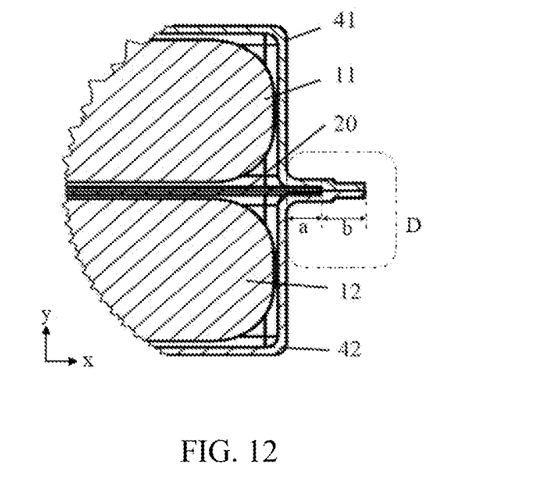
FIG. 12 is a schematic structural diagram of a region C shown in FIG. 11.

For example, in a specific embodiment of this application, referring to FIG. 10 (FIG. 10 is a schematic exploded view of a structure of an electrochemical device before sealing), a lithium-ion battery with an overall thickness of 4.5 mm is formed by stacking a first electrode assembly 11 and a second electrode assembly 12 in an up-down sequence. Both the first electrode assembly 11 and the second electrode assembly 12 are jelly-roll structures. The first electrode assembly 11 is separated from the second electrode assembly 12 by a double-layer partition plate 20. The two electrodes of the first electrode assembly 11 are led out through the corresponding first positive tab 51 and first negative tab 52. The corresponding positions on the first positive tab 51 and the first negative tab 52 are coated with a tab adhesive (not shown in the drawing). The two electrodes of the second electrode assembly 12 are led out through the corresponding second positive tab 53 and second negative tab 54. The corresponding positions on the second positive tab 53 and the second negative tab 54 are coated with a tab adhesive (not shown in the drawing). The first packaging body 41 and the partition plate 20 constitute a first cavity that accommodates the first electrode assembly 11, the first positive tab 51, the first negative tab 52, and the electrolyte. The second packaging body 42 and the partition plate 20 constitute a second cavity that accommodates the second electrode assembly 12, the second positive tab 53, the second negative tab 54, and the electrolyte. The first packaging body 41 and the second packaging body 42 are aluminum plastic films. A first dent 411 and a second dent 421 are formed by punching on one side. A first flange 412 and a second flange 422 are formed around the dents correspondingly. The partition plate 20 includes a 0.04 mm-thick stainless steel partition layer 201 and a 0.02 mm-thick first bonding layer 202 that is made of modified PP and located on the first surface of the partition layer 201. The length and the width of the partition plate 20 are respectively less than the length and the width of the packaging shell 40 that includes the first flange 412 or second flange 422, but greater than the length and the width of the first dent 411 or second dent 421. The dimensions of the first packaging body 41 are the same as the dimensions of the second packaging body 42. In assembling the electrochemical device 100, the partition plate 20 is located in the middle, to which the packaging shell 40 or the electrode assemblies 10 are distributed on the left and right. The first packaging body 41 is aligned with the second packaging body 42 on four sides, and the first bonding layer 202 is adjacent to the second packaging body 42. The first region 621 of the second flange is hermetically connected to the partition plate 20. The second region 612 of the first flange is hermetically connected to the second region 622 of the second flange. After sealing, as shown in FIG. 1, the tabs 50 are arranged in positions separated from each other, without overlapping in the thickness direction y. The width a of the first region 601 is 0.8 mm, and the width b of the second region 602 is 1.0 mm. A seal edge is formed after completion of heat sealing. Because the seal head is flat, the seal edge is a flat surface, as shown in FIG. 5. Through the edge folding process, the first lateral seal edge 4123, the second lateral seal edge 4124, and the bottom seal edge 4122 of the lithium-ion battery are folded along a joint between the first flange 412/second flange 422 and the first dent 411/second dent 421, and are bonded together by dispensing adhesive (not shown in the drawing), so as to form a lithium-ion battery with a single-fold structure. The series battery contains four tabs 50. The electrically series connection between the two electrode assemblies 10 is implemented by connecting to a protection circuit module.

Figure 15:
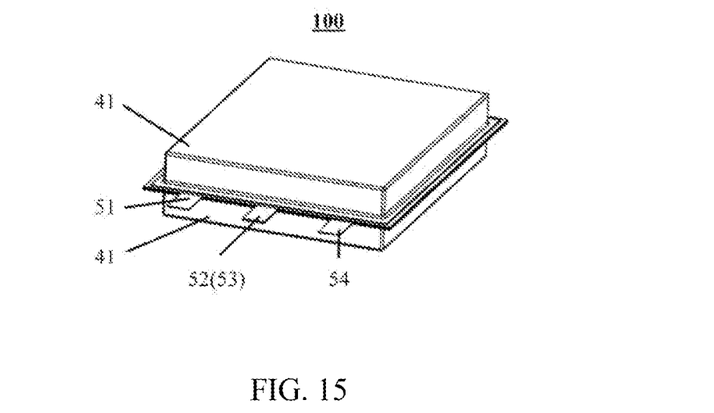
FIG. 15 is a schematic structural diagram of an electrochemical device according to still some other embodiments of this application.

In another specific embodiment of this application, referring to FIG. 10, a lithium-ion battery with an overall thickness of 3.6 mm is formed by stacking a first electrode assembly 11 and a second electrode assembly 12 in an up-down sequence. Both the first electrode assembly 11 and the second electrode assembly 12 are stacked structures. The first electrode assembly 11 is separated from the second electrode assembly 12 by a double-layer partition plate 20. The two electrodes of the first electrode assembly 11 are led out through the corresponding first positive tab 51 and first negative tab 52. The corresponding positions on the first positive tab 51 and the first negative tab 52 are coated with a tab adhesive (not shown in the drawing). The two electrodes of the second electrode assembly 12 are led out through the corresponding second positive tab 53 and second negative tab 54. The corresponding positions on the second positive tab 53 and the second negative tab 54 are coated with a tab adhesive (not shown in the drawing). The first packaging body 41 and the partition plate 20 constitute a first cavity that accommodates the first electrode assembly 11, the first positive tab 51, the first negative tab 52, and the electrolyte. The second packaging body 42 and the partition plate 20 constitute a second cavity that accommodates the second electrode assembly 12, the second positive tab 53, the second negative tab 54, and the electrolyte. The first packaging body 41 and the second packaging body 42 are aluminum plastic films. A first dent 411 and a second dent 421 are formed by punching on one side. A first flange 412 and a second flange 422 are formed around the dents correspondingly. The partition plate 20 includes a 0.05 mm-thick aluminum alloy partition layer 201 and a 0.025 mm-thick first bonding layer 202 that is made of modified PP and located on the first surface of the partition layer 201. The length and the width of the partition plate 20 are respectively less than the length and the width of the packaging shell 40 that includes the first flange 412 or second flange 422, but greater than the length and the width of the first dent 411 or second dent 421. The dimensions of the first packaging body 41 are the same as the dimensions of the second packaging body 42. In assembling the electrochemical device 100, the partition plate 20 is located in the middle, to which the packaging shell 40 or the electrode assemblies 10 are distributed on the left and right. The first packaging body 41 is aligned with the second packaging body 42 on four sides, and the first bonding layer 202 is adjacent to the first packaging body 41. The first region 611 of the first flange is hermetically connected to the partition plate 20. The second region 612 of the first flange is hermetically connected to the second region 622 of the second flange. After sealing, as shown in FIG. 15, the first negative tab 52 and the second positive tab 53 completely overlap in the thickness direction y, and are arranged in positions separated from the first positive tab 51 and the second negative tab 54. The width a of the first region 601 is 1.3 mm, and the width b of the second region 602 is 0.8 mm. The two regions are simultaneously heat-sealed by using a seal head designed to be a stepped structure, so as to form a second sub-region I 6021 and a second sub-region II 6022. After completion of heat sealing, a seal edge is formed. Through an edge folding process, the first lateral seal edge 4123, the second lateral seal edge 4124, and the bottom seal edge 4122 are folded for a first time along a joint between the second sub-region I 6021 and the second sub-region II 6022, and then folded along a joint between the first flange 412/second flange 422 and the first dent 411/second dent 421, and are fixed firmly by dispensing adhesive at the two folds, so as to form a lithium-ion battery with a double-fold structure. The series battery contains four tabs 50. The electrically series connection between the two electrode assemblies 10 is implemented by connecting to a protection circuit module.

In each embodiment of this application, the electrochemical device 100 adopts the double-layer partition plate 20 with a total thickness less than the total thickness of two layers of aluminum plastic films. Therefore, the energy density achieved in this application is higher than that of an electrochemical device formed by directly stacking two finished pouch-type electrode assemblies 10. In addition, because the partition plate 20 is double-layered, the total thickness of the seal edges is still relatively thin after the partition plate is heat-sealed together with the first flange 412 and the second flange 422, thereby ensuring the sealing effect, implementing the folding of the seal edge, avoiding waste of space, and increasing the energy density of the lithium-ion battery. In addition, such a sealing manner reduces the folding stress of the seal edge, thereby improving the sealing reliability of the lithium-ion battery.

A second aspect of this application provides an electronic device. The electronic device includes the electrochemical device according to the first aspect of this application. The electronic device achieves a high energy density and sealing reliability.

The electronic device according to this application is not particularly limited, and may be, but is not limited to: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, a power tool, a flashlight, a camera, a large household battery, a lithium-ion capacitor, or the like.

It needs to be noted that the relational terms such as "first" and "second" herein are used merely to differentiate an entity from another, but do not require or imply any actual relationship or sequence between the entities. Moreover, the terms "include", "comprise", and any variation thereof are intended to cover a non-exclusive inclusion relationship in which an object or device that includes or comprises a series of elements not only includes such elements, but also includes other elements not expressly specified herein or inherent elements of the object or device.

In addition, in the application, a directional or positional relationship indicated by the terms such as "width", "thickness", "upper", "lower", "after", "left", "right", "top", "bottom", "in", "out", or "away from" is a directional or positional relationship based on the illustration in the drawings, and is merely intended for ease of describing the technical solutions in the corresponding embodiment of this application and for brevity of description, but not intended to indicate or imply that the device or component is necessarily located in the specified direction or necessarily constructed or operated in the specified direction. Therefore, such terms are not to be understood as a limitation on this application.

The embodiments in this specification are all described in a correlative manner. For the same or similar part, reference may be made between the embodiments, and each embodiment focuses on differences from other embodiments.

What is described above is merely preferred embodiments of this application, but is not intended to limit this application. Any modifications, equivalent substitutions, and improvements made within the spirit and principles of this application still fall within the protection scope of this application.

What is claimed is:

1. An electrochemical device, wherein the electrochemical device comprises:

a packaging shell comprising a first packaging body and a second packaging body, the first packaging body is provided with a first dent and a first flange connected to a sidewall of the first dent, and the second packaging body is provided with a second dent and a second flange connected to a sidewall of the second dent;

a first electrode assembly disposed in the first dent;

a second electrode assembly disposed in the second dent; and a partition plate comprising a partition layer and a first bonding layer located on a first surface of the partition layer, and the partition plate is located between the first packaging body and the second packaging body; along a first direction, the first flange and the second flange each comprise a first region and a second region; in the first region, the flange overlaps the partition plate in a second direction; in the second region, the flange extends beyond an edge of the partition plate; and the first direction is a width direction of the first flange and the second flange, and the second direction is a thickness direction of the partition plate;

the partition plate fits with the first packaging body and the second packaging body to form mutually independent cavities on two sides of the partition plate respectively;

wherein a thickness of the partition plate is 30 µm to 100 µm.

2. The electrochemical device according to claim 1, wherein the first bonding layer is located at least in a peripheral region of the first surface of the partition layer, and an area of the peripheral region is not less than an area of the first region.

3. The electrochemical device according to claim 1, wherein the partition plate further comprises a second bonding layer located on a second surface of the partition layer, the second bonding layer is located at least on a peripheral region of the second surface of the partition layer, and the first region of the second flange and the second bonding layer are in airtight connection.

4. The electrochemical device according to claim 1, wherein along the first direction, the second region comprises a second sub-region I and a second sub-region II, the second sub-region II is located on a side of the second sub-region I away from the first region, and a thickness of the second sub-region II is less than a thickness of the second sub-region I.

5. The electrochemical device according to claim 1, wherein a width of the first region is greater than or equal to 0.8 mm, and a width of the second region is greater than or equal to 0.8 mm.

6. The electrochemical device according to claim 1, wherein a material of the partition layer comprises at least one of a metal material, a first polymer material, or a carbon material; and a material of the first bonding layer and/or the second bonding layer comprises the first polymer material.

7. The electrochemical device according to claim 6, wherein the metal material comprises at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel (SUS), a combination or alloy thereof;

the first polymer material comprises at least one of polyethylene terephthalate, polybutylene terephthalate, polyethylene glycol naphthalate, polyether ether ketone, polyimide, polyamide, polyethylene glycol, polyamide imide, polycarbonate, cyclic polyolefin, polyphenylene sulfide, polyvinyl acetate, polytetrafluoroethylene, polymethylene naphthalene, polyvinylidene difluoride, polyethylene naphthalate, polypropylene carbonate, poly(vinylidene difluoride-hexafluoropropylene), poly(vinylidene difluoride-co-chlorotrifluoroethylene), organosilicon, vinylon, polypropylene, acid anhydride modified polypropylene, polyethylene, ethylene and a copolymer thereof, polyvinyl chloride, polystyrene, polyether nitrile, polyurethane, polyphenylene ether, polyester, polysulfone, poly(amorphous α-co-olefin), or a derivative thereof; and the carbon material comprises at least one of carbon felt, carbon film, carbon black, acetylene black, fullerene, conductive graphite film, or graphene film.

8. The electrochemical device according to claim 1, wherein tabs of different polarities are disposed on the first electrode assembly and the second electrode assembly respectively, the tabs extend out of the packaging shell from the second region separately, and adjacent electrode assemblies are connected in series by the tabs.

9. An electronic device, comprising:
an electrochemical device, wherein
a packaging shell, comprising a first packaging body and a second packaging body, the first packaging body is provided with a first dent and a first flange connected to a sidewall of the first dent, and the second packaging body is provided with a second dent and a second flange connected to a sidewall of the second dent;
a first electrode assembly, disposed in the first dent;
a second electrode assembly, disposed in the second dent; and
a partition plate comprising a partition layer and a first bonding layer located on a first surface of the partition layer, and the partition plate is located between the first packaging body and the second packaging body; along a first direction, the first flange and the second flange each comprise a first region and a second region; in the first region, the flange overlaps the partition plate in a second direction; in the second region, the flange extends beyond an edge of the partition plate; and the first direction is a width direction of the first flange and the second flange, and the second direction is a thickness direction of the partition plate;
the partition plate fits with the first packaging body and the second packaging body to form mutually independent cavities on two sides of the partition plate respectively;
wherein a thickness of the partition plate is 30 μm to 100 μm.

10. The electronic device according to claim 9, wherein the first bonding layer is located at least in a peripheral region of the first surface of the partition layer, and an area of the peripheral region is not less than an area of the first region.

11. The electronic device according to claim 9, wherein the partition plate further comprises a second bonding layer located on a second surface of the partition layer, the second bonding layer is located at least on a peripheral region of the second surface of the partition layer, the first region of the second flange and the second bonding layer are in airtight connection.

12. The electronic device according to claim 9, wherein along the first direction, the second region comprises a second sub-region I and a second sub-region II, the second sub-region II is located on a side of the second sub-region I away from the first region, and a thickness of the second sub-region II is less than a thickness of the second sub-region I.

13. The electronic device according to claim 9, wherein a width of the first region is greater than or equal to 0.8 mm, and a width b of the second region is greater than or equal to 0.8 mm.

14. The electronic device according to claim 9, wherein a material of the partition layer comprises at least one of a metal material, a first polymer material, or a carbon material; and a material of the first bonding layer and/or the second bonding layer comprises the first polymer material.

15. The electronic device according to claim 14, wherein the metal material comprises at least one of Ni, Ti, Cu, Ag, Au, Pt, Fe, Co, Cr, W, Mo, Al, Mg, K, Na, Ca, Sr, Ba, Si, Ge, Sb, Pb, In, Zn, stainless steel (SUS), a combination or alloy thereof;

the first polymer material comprises at least one of polyethylene terephthalate, polybutylene terephthalate, polyethylene glycol naphthalate, polyether ether ketone, polyimide, polyamide, polyethylene glycol, polyamide imide, polycarbonate, cyclic polyolefin, polyphenylene sulfide, polyvinyl acetate, polytetrafluoroethylene, polymethylene naphthalene, polyvinylidene difluoride, polyethylene naphthalate, polypropylene carbonate, poly(vinylidene difluoride-hexafluoropropylene), poly(vinylidene difluoride-co-chlorotrifluoroethylene), organosilicon, vinylon, polypropylene, acid anhydride modified polypropylene, polyethylene, ethylene and a copolymer thereof, polyvinyl chloride, polystyrene, polyether nitrile, polyurethane, polyphenylene ether, polyester, polysulfone, poly(amorphous α-co-olefin), or a derivative thereof; and the carbon material comprises at least one of carbon felt, carbon film, carbon black, acetylene black, fullerene, conductive graphite film, or graphene film.

16. The electronic device according to claim 9, wherein tabs of different polarities are disposed on the first electrode assembly and the second electrode assembly respectively, the tabs extend out of the packaging shell from the second region separately, and adjacent electrode assemblies are connected in series by the tabs.

* * * * *